Figure 1:
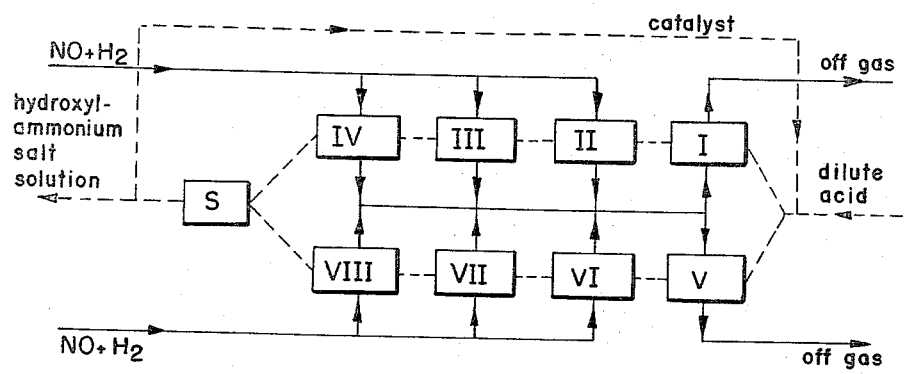

INVENTORS:
KURT JOCKERS
HERMANN MEIER
ERNST EBERHARDT
LUDWIG TAGLINGER

BY Marzall, Johnston, Cook & Root
ATT'YS 3,313,595
**CONTINUOUS PRODUCTION OF HYDROXYL-
AMMONIUM SALTS**
Kurt Jockers, Hermann Meier, Ernst Eberhardt, and Ludwig Taglinger, all of Ludwigshafen (Rhine), Germany, assignors to Badische Anilin- & Soda-Fabrik Aktiengesellschaft, Ludwigshafen (Rhine), Germany
Filed Feb. 14, 1964, Ser. No. 344,929
Claims priority, application Germany, Mar. 8, 1963,
B 71,041
9 Claims. (Cl. 23—117)

This invention relates to a process for the continuous production of hydroxylammonium salts by catalytic reduction of nitric oxide with hydrogen in successive stages.

Hydroxylammonium salts are known to have been prepared by reducing nitric oxide with hydrogen in contact with platinum catalysts in the presence of dilute inorganic acids. This method has been further developed in several respects. The improvements mainly relate to the use of special catalysts and to methods of preparing and regenerating such catalysts.

In the batchwise production of hydroxylammonium salts by the said methods, a suspension of the catalyst in dilute acid, for example 5 to 25% sulfuric acid or hydrochloric acid, is gassed with a mixture of nitric oxide and hydrogen until the acid has almost completely been neutralized by the hydroxylamine and ammonia formed as reaction products. The catalyst is then separated from the salt solution formed, mixed with dilute acid and again gassed with nitric oxide and hydrogen.

One of the disadvantages of the batchwise method is that the actual reaction has to be interrupted for the separation of the reaction solution from the catalyst by filtration, sedimentation or centrifuging and subsequent renewal of the acid. Experience in industrial operation has shown that the time necessary for these procedures is about 25% of the actual reaction period, i.e., that the capacity of a plant is decreased to about 80% by the interruption of the reaction.

Attempts have therefore been made to carry out the process continuously.

According to a prior art method suggested for continuous operation, an adequate amount of the reaction mixture is removed periodically or continuously from the reaction system and replaced by fresh acid so that the pH value of the reaction medium does not rise above 2.5.

Surprisingly, it has been found that when carrying out the said process continuously, not only is the capacity of the plant not increased by the expected 20% but on the contrary it falls below the capacity in batchwise operation. The yield of hydroxylamine, with reference to the amounts of hydrogen, nitric oxide and dilute acid used, also falls. Moreover a pH value of about 1.2 to 1.8 must be maintained in order to keep consumption of sulfuric acid to a minimum. This means that the hydroxylammonium salt solution formed is about 0.15 N to 0.25 N in free acid.

We have now found that the said disadvantages in the continuous production of hydroxylammonium salts by catalytic reduction of nitric oxide with hydrogen in the presence of dilute inorganic acids can be avoided when the reduction is carried out in a plurality of successive stages, the fresh acid being supplied to the first stage and the hydroxylammonium salt solution being withdrawn from the last stage, an acid concentration which is less from stage to stage being maintained in the individual stages. The catalyst may either remain in the individual stages or move from stage to stage with the reaction liquid. If the latter procedure is adopted, the catalyst must be separated from the final hydroxylammonium salt solution and returned to the first stage, advantageously with fresh acid.

The reduction is advantageously carried out in at least three stages. When carrying out the reaction in more than six stages it is recommended to arrange each half of the stages in series and the two systems in parallel, for example as shown in flow sheet 1 (FIGURE 1 of the accompanying drawings).

Starting from a 4.0 N acid and using four stages, an acid concentration of 2.5 to 3.5 N is preferably maintained in the first stage and of 0.2 to 0.5 N in the first stage. In other words, the concentration in the first stage is at least about five times higher than the concentration in the last stage so as to consume a sufficient amount of sulfuric acid in the process to make it practical and economical. If acids of lower or higher concentration are used, the acid concentration in the first stage is correspondingly lower or higher. Recycling of hydroxylamine solution to the first stage has the same effect as using an acid of lower concentration. The concentration in the last stage is lower the lower the desired specific consumption of acid, but a certain minimum value of acid must be maintained, i.e., so that the pH value does not rise above 2.5 in the last stage, a limiting value which is recognized in this art. When using more or less stages than four, the acid concentration of the first stage is higher or lower.

Figure 2:
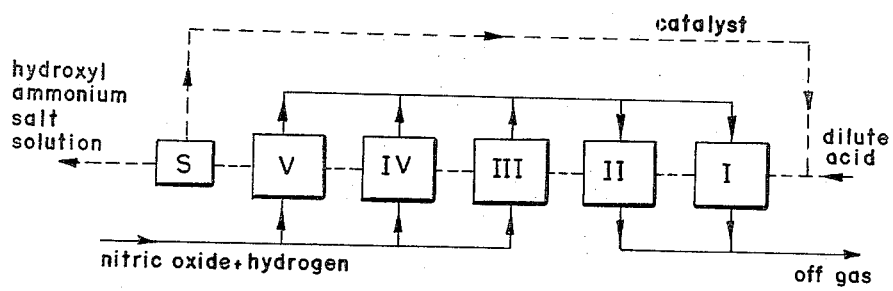

Although the individual stages are arranged consecutively in relation to the reaction liquid, it is not necessary for them to be arranged successively in relation to the gas stream. It is advantageous to choose a combined arrangement in which individual stages are arranged in parallel and off-gas from these stages is supplied to a stage in which a higher acid concentration is maintained. Such an arrangement is illustrated in flow sheet 2 (shown in FIGURE 2 of the accompanying drawings).

In this flow sheet five reaction stages I to V are assumed. Dilute acid is supplied to stage I and during its passage to stage V is substantially consumed. The catalyst is separated in a separator S from the hydroxylammonium salt solution by filtration, sedimentation or by means of a centrifuge and is added to the fresh acid prior to stage I. The gas mixture of hydrogen and nitric oxide flows in parallel through stages V, IV and III. The off-gas from these stages is supplied in parallel to stages II and I.

This arrangement of the stages in relation to the gas stream is only one of several possibilities. If for economical reasons it is desired to operate individual stages with the off-gas from other stages, such off-gas must always be supplied to a reaction unit having a higher acid concentration. This requirement arises mainly from the fact that commercial hydrogen usually contains, and commercial nitric oxide always contains, a certain proportion of nitrogen which is enriched in the off-gas from any stage and therefore the partial pressures of hydrogen and nitric oxide are decreased, leading to lower space-time yields when this off-gas is used. It has been found that this decrease in the space-time yields is far less noticeable in stages having higher concentration than in stages having medium or low acid concentration.

This means that the content of inert gas in the off-gas of the entire system in the multistage system according to this invention may be kept substantially higher than in a continuous one-stage process, and consequently that the yields of hydroxylamine, with reference to hydrogen and nitric oxide, are better. If the contents of nitrogen in the hydrogen and nitric oxide used are constant (this being always substantially the case with commercial gases), and if the ratio of hydrogen to nitric oxide in the gas mixture supplied to the synthesis is constant, then the content of nitrogen is also constant. The better the conversion of hydrogen and nitric oxide is, the higher will be the content of nitrogen in the off-gas. The nitrogen content of the off-gas is thus a direct measure of the conversion of hydrogen and nitric oxide.

The continuous process for the production of hydroxylammonium salts with stages having decreasing acid concentration in accordance with this invention has the following advantages, inter alia, over the prior art one-stage continuous method:

(a) The capacity of a given plant is greater because the activity of the platinum catalysts used (i.e., the amount of nitric oxide reacted per gram of platinum per hour) is greater than with the prior art one-stage process;

(b) The yield of hydroxylamine in relation to hydrogen, nitric oxide and dilute acid is greater than in the prior art method because the specificity of the platinum catalysts used declines less than under the conditions of the prior art method. Specificity of the catalyst is defined as the molar ratio of hydroxylamine formed to nitric oxide reacted, the amount of reacted nitric oxide in moles being equated with the sum of the hydroxylamine in moles formed and the ammonia in moles formed. This means that the undesirable formation of ammonia is repressed in the process according to this invention;

(c) The yield of hydroxylamine in relation to hydrogen and nitric oxide is also better because the process according to this invention permits better utilization of commercial gases.

Dilute sulfuric acid, dilute hydrochloric acid or dilute phosphoric acid may be used for example as the dilute acid. The concentration of these acids is advantageously chosen so that hydroxylammonium salt solutions having the highest possible concentration are formed. When using sulfric acid or hydrochloric acid, an initial concentration of about 4 N to 5 N is accordingly used for this purpose.

The process according to this invention is advantageously carried out at a temperature at which the reaction heat generated can be conveniently removed with cooling water. Temperatures of about 40° to 50° C. are for example suitable.

There are no special requirements as to the pressure at which the process is carried out. Conversions obtained at atmospheric pressure are generally adequate. For example in the process illustrated in flow sheet 2, the mixture of nitric oxide and hydrogen can be kept at such a pressure in stages V, IV and III that the off-gas from these stages may be expanded direct into stages II and I. It is also possible however for atmospheric pressure to prevail in stages V, IV and III and to compress the off-gas from these stages before it enters stages II and I.

The platinum catalysts used are in general those having a content of 0.3 to 5% of platinum. Examples of suitable catalysts are those described in our U.S. patent specifications Nos. 2,823,101 and 3,060,133.

Considerable importance for carrying out the process according to this invention is attached to periodic gassing of the catalyst with nitric oxide free from hydrogen or with a mixture of nitric oxide and nitrogen or with a mixture of nitric oxide and carbon dioxide. This treatment is advantageously carried out between stage V and the separation of the catalyst from the hydroxylammonium salt solution in the separator S (flow sheet 2).

The following example gives a technical comparison between the multistage continuous process according to this invention and the prior art batchwise method and the prior art one-stage continuous method in a system composed of four reactors.

EXAMPLE

The initial materials are 95% nitric oxide, 98% hydrogen and 4.5 N sulfuric acid. The product is a solution of hydroxylammonium sulfate which is 0.3 N in free sulfuric acid. The catalyst is a 1% platinum-carbon catalyst. The heat of reaction is removed by means of river water so that a temperature of 43° C. is maintained in the reaction system. Where volumes of gas are referred to these are volumes measured under standard conditions (0° C., 760 mm. Hg) and in the dry state.

*A. Batchwise process*

Four identical reactors having external coolers are each charged with 6,000 liters of a 4.5 N sulfuric acid and 150 kg. of a 1% platinum catalyst. The contents of each vessel are gassed with equal amounts of a mixture of hydrogen and nitric oxide. The sulfuric acid is increasingly neutralized by the formation of hydroxylamine and small amounts of ammonia. The gas charge of the system is slowly decreased in accordance with the change in the activity of the catalyst caused by the decreasing hydrogen ion concentration. Unabsorbed gas is burned off after it has been measured. After 8.25 hours, the acid is used up to such an extent that the solution is only 0.3 N in free acid. The reaction is then stopped. Up to this time 2,680 cu. m. of nitric oxide (95%—equivalent to 2,545 cu. m. of 100% NO+135 cu. m. of $N_2$) and 4,460 cu. m. of hydrogen (98%—equivalent to 4,370 cu. m. of 100% $H_2$+90 cu. m. of $N_2$) have been introduced in all. 1,350 cu. m. of off-gas is measured consisting of:

Hydrogen _____ cu. m__ 840
Nitric oxide _____ cu. m__ 285
Nitrogen _____ cu. m__ 225

Consumption of nitric oxide is thus 2,260 cu. m. or 3,030 kg. From this an average activity of the catyst of $$\frac{3,030,000}{8.25 \times 6,000} g.$$

of NO per g. of Pt per hour=61.2 g. may be calculated. The products are 3,120 kg. of hydroxylamine and 105 kg. of ammonia. From this the specificity of the catalyst is calculated as being about 94%.

After gassing of the catalyst suspension is over, the catalyst is filtered off and 24,000 liters of fresh 4.5 N sulfuric acid is added. 2.5 hours are required from the end of the gassing to the commencement of a fresh gassing. The duration of each charge is thus 8.25+2.5 =10.75 hours. The output of the batchwise system is thus calculated as 291 kg. of hydroxylamine per hour.

Nitric oxide (calculated as 100% gas) ___cu. m__ 81.5
Hydrogen (calculated as 100% gas) _____cu. m__ 140.0
Sulfuric acid (calculated as 100% acid) ____kg__ 169.0 are necessary for the production of each 100 kg. of hydroxylamine.

*B. Continuous one-stage process*

The same reaction system as that described under (A) is charged with the amounts of dilute sulfuric acid and catalyst therein specified and gassed with a mixture of nitric oxide and hydrogen until the liquid in each reactor is 0.3 N in free sulfuric acid. After this the activity of the catalyst is only 41 g. of NO per g. of platinum per hour, whereas its specificity has fallen to about 90%; i.e. 90% of the nitric oxide reacted is converted into hydroxylamine and 10% into ammonia. Gassing in the four reactors is then kept constant and hydroxylammonium sulfate solution is withdrawn from the system continuously and dilute sulfuric acid added so that the liquid in each reactor remains at 0.3 N in free sulfuric acid. The system remains in equilibrium if it is gassed per hour with a mixture of 220 cu. m. of nitric oxide (95%) and 365 cu. m. of hydrogen (98%). 107 cu. m. of off-gas escapes per hour. According to analysis, this off-gas consists of 25 cu. m. of nitric oxide, 62 cu. m. of hydrogen and 20 cu. m. of nitrogen. 242 kg. of hydroxylamine is withdrawn per hour as sulfate solution and 14 kg. of ammonia formed as a byproduct, and 1690 liters of dilute sulfuric acid is freshly introduced.

The output of this continuous one-stage process is:

Hydroxylamine per hour _____ kg__ 242
Nitric oxide (calculated as 100% gas) ___cu. m__ 86.5
Hydrogen (calculated as 100% gas) _____cu. m__ 148.0
Sulfuric acid (calculated as 100% acid) ____kg__ 178.0 are required for the production of each 100 kg. of hydroxylamine.

C. Continuous multistage process according to this invention

Figure 3:
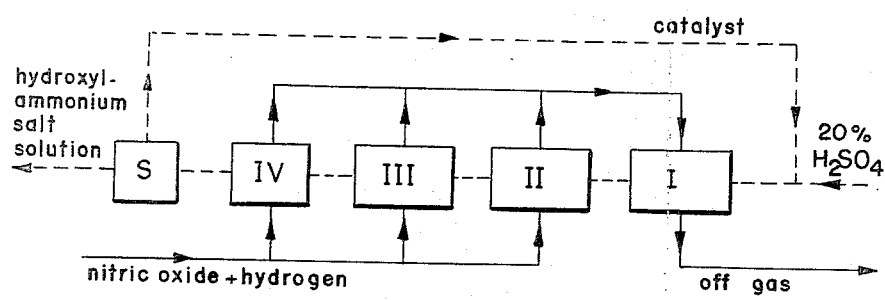

The four reactors described under (a) are grouped together as shown in flow sheet 3 (FIGURE 3 of the accompanying drawings). Each of the reactors is first filled with 6,000 liters of 4.5 N sulfuric acid and 150 kg. of the 1% platinum catalyst. With the connecting pipes closed, the contents of each vessel are gassed direct with the mixture of hydrogen and nitric oxide so that the concentration of free sulfuric acid in the individual reactors has about the following values.

Vessel: | Normality of sulfuric acid
I _____ 3.20
II _____ 2.00
III _____ 0.95
IV _____ 0.30

The connections between the individual reactors are then opened.

20% sulfuric acid together with platinum catalyst separated in the separator S from the hydroxylammonium sulfate solution formed are introduced into reactor I and passed thence through reactors II, III and IV to the separator S. In this way hydroxylammonium sulfate solution is formed from the sulfuric acid and leaves the system at S. The mixture of nitric oxide and hydrogen is passed in parrellel through reactors IV, III and II. The off-gas from these reactors is collected and then passed through reactor I. After having left this reactor the remaining off-gas is burnt.

The system achieves equilibrium when the following approximate data are maintained:

A total of 305 cu. m. of 95% nitric oxide and 510 cu. m. of 98% hydrogen is supplied per hour to reactors IV, III and II. The gas stream to reactor IV is the least and that to to reactor II the most. The off-gas from these reactors is compressed with a water ring pump and then supplied to reactor I. The off-gas from this stage is burnt. The hourly amount thereof consists of Nitric oxide _____cu. m__ 14
Hydrogen _____cu. m__ 71
Nitrogen _____cu. m__ 26

The activity of the catalyst amounts on an average to 61.6 g. of NO per g. of platinum per hour. From the 370 kg. of nitric oxide per hour reacted there are formed at a specificity of the catalyst of about 94%, 380 kg. of hydroxylamine and 12 kg. of ammonia which are removed from the system as sulfate solution through the separator S. It is therefore necessary to supply to the system 2,940 liters of 4.5 N sulfuric acid per hour.

The ouput of this multistage continuous process is thus 380 kg. of hydroxylamine per hour.

The following must be supplied for the production of 100 kg. of hydroxylamine:

Nitric oxide (calculated as 100% gas) ____cu. m__ 76.2
Hydrogen (calculated as 100% gas) _____cu. m__ 131.5
Sulfuric acid (calculated as 100% acid) ____kg__ 170.5

The results achieved by the various methods are compared in the following table:

|  | Batch-wise process | One-stage continuous process | Four-stage continuous process |
|---|---|---|---|
| Output in kg. NH$_2$OH/h | 291.0 | 242.0 | 380.0 |
| Inputs per 100 kg. NH$_2$OH: |  |  |  |
| Cu. m. 100% NO | 81.5 | 86.5 | 76.2 |
| Cu. m. 100% H$_2$ | 140.0 | 148.0 | 131.5 |
| Kg. 100% H$_2$SO$_4$ | 170.0 | 178.0 | 170.0 |

The improved efficiency of the multistage process as compared with the prior art methods is clearly shown by the table. The technical advance achievable by the process according to this invention is evident in the increased hourly output of the process and in the lower inputs of nitric oxide and hydrogen. A comparison of the conversion factors for nitric oxide (nitric oxide reacted:nitric oxide introduced), in combination with the above-mentioned data, demonstrates the superiority of the process according to this invention. In the batchwise method a NO-conversion of 88.7% is calculated from the above values, in the one-stage continuous process the NO-conversion is 87.8% and in the four-stage continuous process according to this invention it is 95%.

We claim:

1. In a process for the continuous production of hydroxylammonium sulfate by catalytic reduction of nitric oxide with hydrogen in contact with a platinum catalyst and dilute sulfuric acid, the improvement which comprises carrying out said reduction in a system of at least two separate successive stages wherein the dilute sulfuric acid is supplied to the first stage and continuously passed through each succeeding stage, a mixture of said hydrogen and nitric oxide is gassed into each separate stage and the resulting hydroxylammonium sulfate solution is withdrawn from the last stage, both the amount of said acid introduced into the first stage and the input gaseous hydrogen and nitric oxide into each stage being adjusted so as to maintain a decreasing acid concentration from statge to stage, the acid concentration in the last stage being such that the pH does not rise above 2.5 and the acid concentration in the first stage being at least about five times higher than the acid concentration in the last stage.

2. A process as claimed in claim 1 wherein an acid concentration of 2.5 to 3.5 N is maintained in the first stage and an acid concentration of 0.2 to 0.5 N is maintained in the last stage.

3. A process as claimed in claim 1 wherein a partly reacted gaseous mixture of hydrogen and nitric oxide is withdrawn from at least one of said succeeding stages of lower acid concentration and passed through a preceding stage of higher acid concentration.

4. A process as claimed in claim 1 wherein the reduction is carried out in at least three stages.

5. A process as claimed in claim 1 wherein the catalyst is periodically gassed with nitric oxide in the absence of hydrogen.

6. A process as claimed in claim 1 wherein the catalyst is periodically gassed with a mixture of nitric oxide and nitrogen in the absence of hydrogen.

7. A process as claimed in claim 1 wherein the catalyst is periodically gassed with a mixture of nitric oxide and carbon dioxide in the absence of hydrogen.

8. A process as claimed in claim 1 wherein the reduction is carried out at a temperature of 40° to 50° C.

9. A process as claimed in claim 1 wherein the reduction is carried out in at least six reactors divided into two parallel systems, each of which contains the same number of reactors arranged in series, with reference to the liquid flow of the acid.

References Cited by the Examiner

UNITED STATES PATENTS

| 2,628,889 | 2/1953 | Benson | 23—190 |
| 2,798,791 | 7/1957 | Jockers et al. | 23—190 X |
| 3,009,779 | 11/1961 | Wintersberger et al. | 23—190 |
| 3,119,657 | 1/1964 | Horvitz et al. | 23—87 |

OSCAR R. VERTIZ, *Primary Examiner.*

J. J. BROWN, H. S. MILLER, *Assistant Examiners.*